(12) United States Patent
Simonis et al.

(10) Patent No.: US 12,493,184 B2
(45) Date of Patent: Dec. 9, 2025

(54) METHOD FOR ASSEMBLING A HEAD-UP DISPLAY, AND HEAD-UP DISPLAY

(71) Applicant: VALEO SCHALTER UND SENSOREN GMBH, Bietigheim-Bissingen (DE)

(72) Inventors: Karl Simonis, Bietigheim-Bissingen (DE); Oezguer Salmanoglu, Bietigheim-Bissingen (DE); Fatih Dilaver, Bietigheim-Bissingen (DE); Daniel Kuntze, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 309 days.

(21) Appl. No.: 18/553,204

(22) PCT Filed: Mar. 29, 2022

(86) PCT No.: PCT/EP2022/058200
§ 371 (c)(1),
(2) Date: Sep. 29, 2023

(87) PCT Pub. No.: WO2022/207598
PCT Pub. Date: Oct. 6, 2022

(65) Prior Publication Data
US 2024/0210693 A1 Jun. 27, 2024

(30) Foreign Application Priority Data
Apr. 1, 2021 (DE) ...................... 10 2021 108 407.5

(51) Int. Cl.
*G02B 27/01* (2006.01)
*G02B 7/182* (2021.01)

(52) U.S. Cl.
CPC ......... *G02B 27/0149* (2013.01); *G02B 7/182* (2013.01)

(58) Field of Classification Search
CPC ........................... G02B 27/0149; G02B 7/182
See application file for complete search history.

(56) References Cited

U.S. PATENT DOCUMENTS

| 10,310,262 | B2 | 6/2019 | Ogasawara et al. |
| 2013/0155520 | A1 | 6/2013 | Shimada et al. |
| 2020/0363637 | A1* | 11/2020 | Uto ...................... G02B 7/1821 |

FOREIGN PATENT DOCUMENTS

| DE | 10 2016 220 540 A1 | 4/2017 |
| DE | 10 2017 109 022 A1 | 10/2018 |

(Continued)

OTHER PUBLICATIONS

International Search Report issued in corresponding International Application No. PCT/EP2022/058200 mailed Jul. 15, 2022 (5 pages).

(Continued)

*Primary Examiner* — James C. Jones
(74) *Attorney, Agent, or Firm* — Osha Bergman Watanabe & Burton LLP

(57) ABSTRACT

The invention relates to a method for assembling a head-up display (1), comprising the following steps: —attaching a first, resilient compression element (18) to a first edge region (16) of a rear face (14) of the first mirror (13) and attaching a second, resilient compression element (19) to a second edge region (17) of the rear face (14) of the first mirror (13); —introducing the first mirror (13) into a cover module (3) of a housing (2) of the head-up display (1) and adjusting a pre-assembly position of the first mirror (13) in the cover module (3), in which position the compression elements (18, 19) abut support surfaces (27, 28) of the cover module (3); —attaching a base module (6) to the cover module (3), (Continued)

wherein, during the connection process, a front face (15) of the first mirror (13) is contacted by contact elements (23, 24) of the base module (6) and the first mirror (13) is pressed into a final assembly position.

15 Claims, 8 Drawing Sheets

(56) References Cited

FOREIGN PATENT DOCUMENTS

| | | |
|---|---|---|
| DE | 2020 20 107 309 U1 | 3/2021 |
| DE | 10 2019 131 279 A1 | 5/2021 |
| JP | 2020-138673 A | 9/2020 |

OTHER PUBLICATIONS

Written Opinion issued in corresponding International Application No. PCT/EP2022/058200 mailed Jul. 15, 2022 (6 pages).

German Search Report issued in corresponding German Patent Application No. DE 10 2021 108 407.5 mailed Nov. 10, 2021 (5 pages).

\* cited by examiner

METHOD FOR ASSEMBLING A HEAD-UP DISPLAY, AND HEAD-UP DISPLAY

One aspect of the invention relates to a method for assembling a head-up display. A further aspect of the invention relates to a head-up display for a motor vehicle.

Head-up displays in motor vehicles usually have a housing. This can be formed from a plurality of subregions. In this context, it can have a cover module and a base module, for example. These two components can be joined together. Plug connections or snap connections or screw connections and the like can be provided here, for example. In this regard, the cover module has an outer housing. The base module can likewise have an outer housing. These two parts in the form of the outer housings or the shells then also form the overall housing of the head-up display. In this regard, they are therefore external visible components of the head-up display. An image generation unit is usually arranged in a head-up display. This generates the images, which can be projected by means of the head-up display onto an external projection surface, such as a window pane of the motor vehicle. In addition, a head-up display has at least one mirror in the interior of the housing. The light beams generated by the image generation unit are reflected by this mirror. In head-up displays, it is also possible, however, to envisage the installation of two separate mirrors in the interior of the housing. As a result, multiple deflection or multiple reflection of the light beams generated by the image generation unit is performed. In this case, a first mirror, which is arranged closer to the image generation unit in the beam path from the image generation unit to an exit window of the head-up display, is also referred to as a fold mirror. With the second mirror arranged downstream of the beam path with respect thereto, the light beams are deflected, in particular toward this exit window of the head-up display. To enable the light deflection and thus the light emission to be performed very precisely, and sharp image representation is therefore also possible, very precise arrangement of the mirrors in the housing, in particular of a mirror which is first in this regard, is required. However, unwanted positional tolerances may occur in this regard during the assembly of the head-up display.

Thus, in the prior art, a first mirror of this kind is fastened, e.g. by way of an additional cover, using a snap connection, to an optical chamber, arranged in the interior of the housing, of the head-up display or is adhesively bonded to this optical camera. In both possibilities, however, the tolerance chain via this optical chamber is very long. The effect is that a mirror tilt arising therefrom results in an incorrect virtual image position. In the procedure involving adhesion of the mirror to the optical chamber, curvature of the mirror can occur on account of the different coefficients of expansion of the materials and, as a result, a distortion of the image to be generated and projected can occur. In the case of the snap-fit option, tolerances occur, and these can lead to positional tolerances in the event of temperature differences and with the continued service life of the head-up display, and this can also be associated with rattling. In this regard, therefore, undesirable noises can also be generated in this context. Flickering of the generated image can also occur.

It is the object of the present invention to provide a method for assembling a head-up display, and such a head-up display, in which the positioning of a first mirror inside the head-up display is improved.

This object is achieved by a method and a head-up display according to the independent claims.

One aspect of the invention relates to a method for assembling a head-up display, having the following steps:
providing a first mirror of the head-up display;
attaching a first, elastic compression element to a first edge region of a rear side of the first mirror and attaching a second, elastic compression element to a second edge region of the rear side of the first mirror;
introducing the first mirror with the compression elements arranged thereon into a cover module of a housing of the head-up display and setting a preassembly position of the first mirror in the cover module, in which the compression elements rest against supporting surfaces of the cover module;
attaching a base module of the housing, which is separate from the cover module, to the cover module, wherein, as the base module is connected to the cover module, a front side of the first mirror is contacted by contact elements of the base module, and, as the base module continues to be joined to the cover module, the first mirror is pressed into a final assembly position, wherein, for this purpose, the compression elements are compressed and the first mirror is pressed against the supporting surfaces of the cover module.

With such a configuration, the problems explained at the outset with regard to the secure and precise positioning of precisely this first mirror inside the head-up display can be at least significantly reduced. As a result of this procedure, it is now very easy to introduce the first mirror, preconfigured with the compression elements, into the preassembly position. In this regard, it is therefore not necessary to perform precise positioning of the first mirror in the end position on an associated housing part before the cover module is joined to the base module. The preassembly position is made possible, in particular, by simply inserting the first mirror into the cover module. This preassembly position is therefore not yet defined as the end position or the final assembly position. Therefore, this procedure can be used to support a fast assembly scenario since this preassembly position can also be set very easily and quickly. In particular, the cover module is as it were turned upside down. The trough-shaped cover module is thus positioned in such a way that the trough opening points upward or substantially upward. This makes it particularly easy to introduce the preconfigured first mirror into the interior of the cover module from above and, in this regard, to be able to reach the preassembly position very easily and in a targeted manner. This enables easy setting of the first mirror in the cover module as a preassembly position.

In addition, the compression elements then also ensure that the first mirror does not come into direct contact with the supporting surfaces. This occurs, in particular, only indirectly via the compression elements. In this way, the first mirror can also be protected from unwanted influences, in particular on the rear side, stemming from the supporting surfaces. Thus, by virtue of the compression elements, which are elastic in this regard, the first mirror can then also continue to be moved in a variety of ways relative to the supporting surfaces. This is because, as the assembly scenario progresses, the intended compression property of the compression elements also enables a relative movement of the first mirror with respect to the supporting surfaces, said movement being desired and defined in this regard. This is particularly advantageous in the proposed assembly scenario. This is because, particularly during the assembly of the cover module with the base module, an automatic change in position of the first mirror into a final assembly position can be carried out, starting from the preassembly position. In this regard, this can be achieved in a very targeted manner by virtue of the possibility of compressing the compression elements. Thus, also the desired final assembly position of the first mirror can also be achieved very precisely, in particular also in relation to the supporting surfaces, in a very simple adjustment of the position of the first mirror, which takes place indirectly through the joining of the cover module to the base module.

Thus, in the proposed assembly method, it is specifically desired for the first mirror to move out of the preassembly position in a defined manner as the cover module is joined to the base module. In this regard, it is in particular pressed automatically into the final assembly position. Since the compression elements can also be deformed, in particular compressed, very uniformly the final assembly position is also achieved very precisely. Both in the preassembly position and in the final assembly position, the compression element or compression elements achieve a further advantage in that the first mirror is also arranged with damped support on these supporting surfaces. In particular, it is thereby also possible to enable relative movements between the first mirror and the supporting surfaces in the installed state, in particular also vibration damping.

In one exemplary embodiment, the first mirror is set in the preassembly position in the cover module. This is a particularly simple way of introducing the first mirror into the cover module. In addition, the preassembly position is therefore also simple and quick to achieve. Simply setting it in the cover module thus requires no further complex assembly processes to achieve the preassembly position. In this preassembly position, the first mirror is, in particular, arranged in an oblique setting in the cover module. It is thereby also advantageously possible to avoid unwanted falling over of the first mirror in the preassembly position. The position set in this regard is also maintained relatively reliably. In one exemplary embodiment, the first mirror is set up with a peripheral edge, in particular an upper peripheral edge, on at least one support of the cover module during the setting of the preassembly position. The set-up position in this regard is thereby also correspondingly supported at this peripheral edge. Thus, on the one hand, the mirror rests by means of this peripheral edge directly on these narrow, in particular web-like, supports, and therefore, in this assembly scenario, the mirror can also be reliably positioned in this regard by means of the gravitational force of the first mirror. On the other hand, by means of the compression elements, it rests indirectly against the supporting surfaces, which are oblique in this assembly position of the cover module.

In one exemplary embodiment, the compression elements are provided as elongate strips. In one exemplary embodiment, they can extend over at least 60 percent, in particular at least 70 percent, of the length of the respective edge region of the rear side. In particular, the compression elements are attached to this rear side parallel to a further peripheral edge, which delimits the edge region. This shaping and orientation are advantageous in that strip-shaped direct contacting of a compression element with a corresponding supporting surface is made possible. On the one hand, it is thereby possible to achieve the preassembly position in a very targeted manner. However, the relative movement of the first mirror as the compression elements are compressed and as the first mirror is moved toward the stationary supporting surfaces is then also particularly advantageous as the assembly scenario progresses. Particularly uniform compression of a compression element by way of its respective geometric configuration is thereby made possible. The supporting surface is preferably designed to be uninterrupted, and a compression element rests by means of its strip-shaped, exposed element surface in surface contact, in particular also full-surface contact, against such a supporting surface. It is thereby advantageously possible to enable the abovementioned further scenarios during the assembly of the head-up display.

Moreover, this attachment of the compression elements at the edges provides a design that is relatively economical in terms of components and that can interact mechanically in a particularly advantageous manner with the respective supporting surfaces.

In one exemplary embodiment, the compression elements are provided as foam strips. In particular, in this regard they can be formed in the manner of cuboids or in a rod-shaped manner. Configuration as foam strips, in particular, allows simple handling for attachment to the first mirror. On the other hand, the corresponding desired compressibility is thereby also achieved in a particularly advantageous manner. Not least, a foam configuration is also functional over the long term and thus has a long life in terms of materials. The set final assembly position of the first mirror can be maintained precisely even in the installed final state and in what is then the permanently compressed state of the compression element.

In one exemplary embodiment, a compression element is adhesively bonded to the rear side of the first mirror. In particular, the compression elements are arranged only on these edge regions.

In one exemplary embodiment, the procedure when connecting the base module to the cover module involves first inserting the insertion elements of one module into corresponding insertion receptacles of the other module. This also means that the initially separately provided components relating to the base module and the cover module are moved toward one another. Beginning with the related initiation of the joining process which then takes place, the insertion elements and the insertion receptacles are moved up to one another. Once a relevant assembly state has been achieved, in which state the insertion of the insertion elements into the insertion receptacles is then just beginning and thus interengagement of the insertion elements into the insertion receptacles is beginning, provision is furthermore made in a defined manner in this state for the contact elements to be arranged at a distance from and thus without contact with a front side of the first mirror. This ensures that the first mechanical coupling via the insertion device comprising the insertion elements and insertion receptacles takes effect first, even before contact elements make contact with the front side and exert a force on the first mirror. The interengagement of the insertion elements and the insertion receptacles, which takes place first, ensures the attainment of a basic position between the base module and the cover module, which can no longer be displaced relative to one another in an unwanted manner and thus also no longer to any great extent in a plane perpendicular to this joining direction when contact elements then subsequently touch the front side of the first mirror. Thus, as the assembly scenario progresses, the touching of the front side of the first mirror by the contact elements and the exertion of a force by the contact elements on the front side of the first mirror which then takes place as the assembly scenario progresses is then also made possible in a very directional and defined manner. This is because, in this context, the insertion elements and insertion receptacles, which are already being guided in one another but are then not yet connected to one another in the respective final insertion state, then also form a mechanical guide to enable the corresponding pressing of the contact elements against the front side of the first mirror to be achieved.

A highly effective and highly functional assembly concept is thereby achieved precisely with this intermediate assembly state. Unwanted positional displacements of individual components relative to one another can thereby be avoided. Precisely the direct mechanical contact between the contact elements and the front side of the first mirror which is to be subsequently produced can thereby be enabled very precisely and at exactly the desired point in time during the assembly scenario.

In one exemplary embodiment, as the process of inserting the insertion elements into the insertion receptacle is continued and starting from a fundamentally already achieved interengagement of these insertion elements into the insertion receptacles, the front side is then subsequently contacted in a mechanically direct manner by the contact elements. Starting from this contacting state that has then been achieved between the contact elements and the front side of the first mirror, compression of the compression elements is then automatically achieved as the cover module continues to be joined to the base module and thus as the insertion elements then continue to be inserted into the insertion receptacles, and, as a result, the first mirror is automatically pressed in the direction of the supporting surfaces. This approach of the contact elements to the front side of the first mirror, said approach being guided by the insertion device, and then subsequently furthermore the guided and controlled pressing of the contact elements against the front side and an automatically entailed compression of the compression elements and, in turn, an automatically entailed defined relative movement of the first mirror in the direction of the supporting surfaces also enables the final assembly position of the first mirror to be achieved in a particularly precise and finely controlled manner. Unwanted abrupt force effects on the first mirror and abrupt position adjustments can thereby also be avoided.

In one exemplary embodiment, during the further process of insertion of the insertion elements into the insertion receptacle as the base module and the cover module are joined together, it is automatically ensured that the contact elements, which are then already resting against the front side of the first mirror, are moved relative to the front side in the state in which they are resting against the latter. This relative movement generates a force on the first mirror which moves this first mirror in the direction of the supporting surfaces. Since, owing to the elastic configuration of the compression elements, the compression elements are compressed during this movement of the mirror, this corresponding movement of the mirror toward the supporting surfaces is also furthermore made possible in a particularly advantageous manner. On the one hand, compression elements allow this movement and, on the other hand, they form a damping element which assists this guided movement of the mirror. By virtue of the fact that the compression of the compression elements produces a certain counter-force, the movement of this mirror is made possible in a particularly advantageously guided and directed manner. Moreover, this configuration also makes possible a very uniform movement of the mirror toward these supporting surfaces. In particular, a linear or a substantially linear movement of the first mirror toward the supporting surfaces is thereby made possible in an advantageous manner. The final assembly position is as it were thereby made possible as a position parallel to the preassembly position.

In one exemplary embodiment, the oblique orientation of the contact elements results in the direction of the force being generated at an angle not equal to 0° and not equal to 180° to the joining direction in which the base module is brought together with the cover module.

Thus, the direction of the force which acts on the first mirror is, as it were, not parallel to the, in particular linear, joining direction in which the base module is joined together with the cover module. In particular, this joining direction is to be understood as being on the assembly path on which the insertion elements and the insertion receptacles interengage.

By virtue of this orientation between the force direction and the joining direction, a very favored assembly scenario for the first mirror for transfer from the preassembly position into the final assembly position can be achieved. This therefore also gives rise to the possibility of achieving a relative position between the cover module and the base module during this assembly process, which, in particular, takes place in a linear direction in the joining direction, in order at the same time automatically to achieve a movement of the first mirror relative to the supporting surfaces which is oriented differently thereto. Although, in this regard, various relative movements are simultaneously obtained during this joining of the cover module to the base module, and thus the first mirror is then also moved relative to the cover module and the base module, the cover module and the base module can nevertheless be joined together very precisely and, at the same time, the final assembly position of the first mirror can automatically be achieved in a precise manner.

In one exemplary embodiment, the joining together or connection of the base module to the cover module is carried out by a linear joining movement. In particular, this takes place at least starting from the positional state in which the insertion elements are just engaging in the insertion receptacles. If appropriate, the prior movement of the base module and the cover module up to one another can also take place already in this joining direction and, in this regard, it is possible, in particular, for a linear joining movement to be carried out.

In one exemplary embodiment, the base module is provided with an integral outer housing. The contact elements are formed integrally on the outer housing. In such an exemplary embodiment, it is possible, in particular, to provide for this base-module outer housing to be produced integrally with the contact elements. This can be a plastic component, for example. It can then be produced as an injection molded component.

In one exemplary embodiment, the base module is provided with an outer housing, and a component separate therefrom for producing an optical chamber in the head-up display is installed in the outer housing. This separate component can have a base plate and can have a frame formed integrally on the base plate. A well or chamber is thereby formed, which then, in accordance with the intended purpose, also represents the formation of an optical chamber in the head-up display.

It is also possible for the head-up display to have a second mirror. This is a separate mirror from the first mirror. The second mirror can be installed in the outer housing. The intended purpose of the second mirror is to deflect or reflect light, which has been deflected by the first mirror and which has been reflected from the first mirror to the second mirror, to an exit window of the housing of the head-up display. The base module, which in said exemplary embodiment has the outer housing and the separate component and/or the second mirror, is provided as a base module preassembled with the components in this regard. This preassembled base module can then be connected to the cover module, as explained above.

In one exemplary embodiment, it can be provided that the contact elements are formed integrally on the component that is provided for producing an optical chamber. In the exemplary embodiment, this component too can be produced integrally. It can also be made of plastic.

It is therefore possible for contact elements of the base module to be formed on the outer housing or to be formed on the component or, in a further exemplary embodiment, to be formed as contact elements both on the component and on the outer housing. In each case, an integral configuration can be provided here.

A further aspect of the invention relates to a head-up display for a motor vehicle. The head-up display has a housing. It has a cover module and a base module. Arranged in the housing is a first mirror of the head-up display, by means of which light from an image generation unit of the head-up display can be deflected or is deflected. In particular, the intended purpose of this first mirror is to deflect the light from the image generation unit to a second mirror, which may be present, of the head-up display or to deflect it directly to an exit window of the head-up display if the second mirror is not present.

Elastic compression elements are preferably arranged at edge regions of a rear side of the first mirror. In the assembled final state of the first mirror in the housing, these compression elements rest, in particular directly, against supporting surfaces of the cover module. The base module has, in particular integrated and thus integrally formed therewith, contact elements, which rest against a front side, provided for reflection, of the first mirror, such that the first mirror is subjected to a force in the direction of the supporting surfaces, and as a result, the compression elements are compressed in the assembled final state of the first mirror, and the first mirror is pressed against the supporting surfaces. In this regard, an indirect contact pressure is formed since the first mirror has no direct contact with the supporting surfaces, but in this regard the compression elements are located in between. The advantages that can be achieved by means of such a head-up display have already been mentioned above.

In one exemplary embodiment, the contact elements are formed with strip-shaped contact surfaces oriented obliquely to a longitudinal axis of the head-up display. The joining direction of the modules can be oriented in the direction of this longitudinal axis. These strip-shaped contact surfaces face the edge regions of the front side of the first mirror. In particular, they rest directly against these edge regions of the front side. In one exemplary embodiment, the edge regions of the front side are opposite the edge regions of the rear side, on which the compression elements are arranged. Thus, in one exemplary embodiment, the contact surfaces of the contact elements and the strip-shaped compression elements are also oriented parallel to one another in pairs on opposite sides of the first mirror. A very space-saving yet highly functional construction is thereby made possible. This is, in particular, also with a view to being able to move the first mirror precisely from the preassembly position into the final assembly position, and, on the other hand, to being able to maintain the final assembly position precisely.

In one exemplary embodiment, the contact surfaces of the contact elements are smoothed. This means that they are reduced in their surface roughness, e.g. by milling or polishing. In particular, this is provided in an exemplary embodiment in which the contact elements are a component of the outer housing of the base module and, in particular, are then made of diecast material.

In one exemplary embodiment, the front side of the first mirror can be provided with a reflective film, in particular also at the edge regions, which are intended for the direct abutment thereon of the contact elements of the base module. This can then also be used as an intermediate layer between the glass material of the mirror and the contact element, in particular also as a sliding film for the contact element. The film can be attached by optical bonding.

A further aspect of the invention also relates to a motor vehicle having such a head-up display.

Exemplary embodiments of the invention will be discussed in more detail below on the basis of schematic drawings. In the drawings.

Identical or functionally identical elements are denoted by the same reference signs in the figures.

Figure 1:
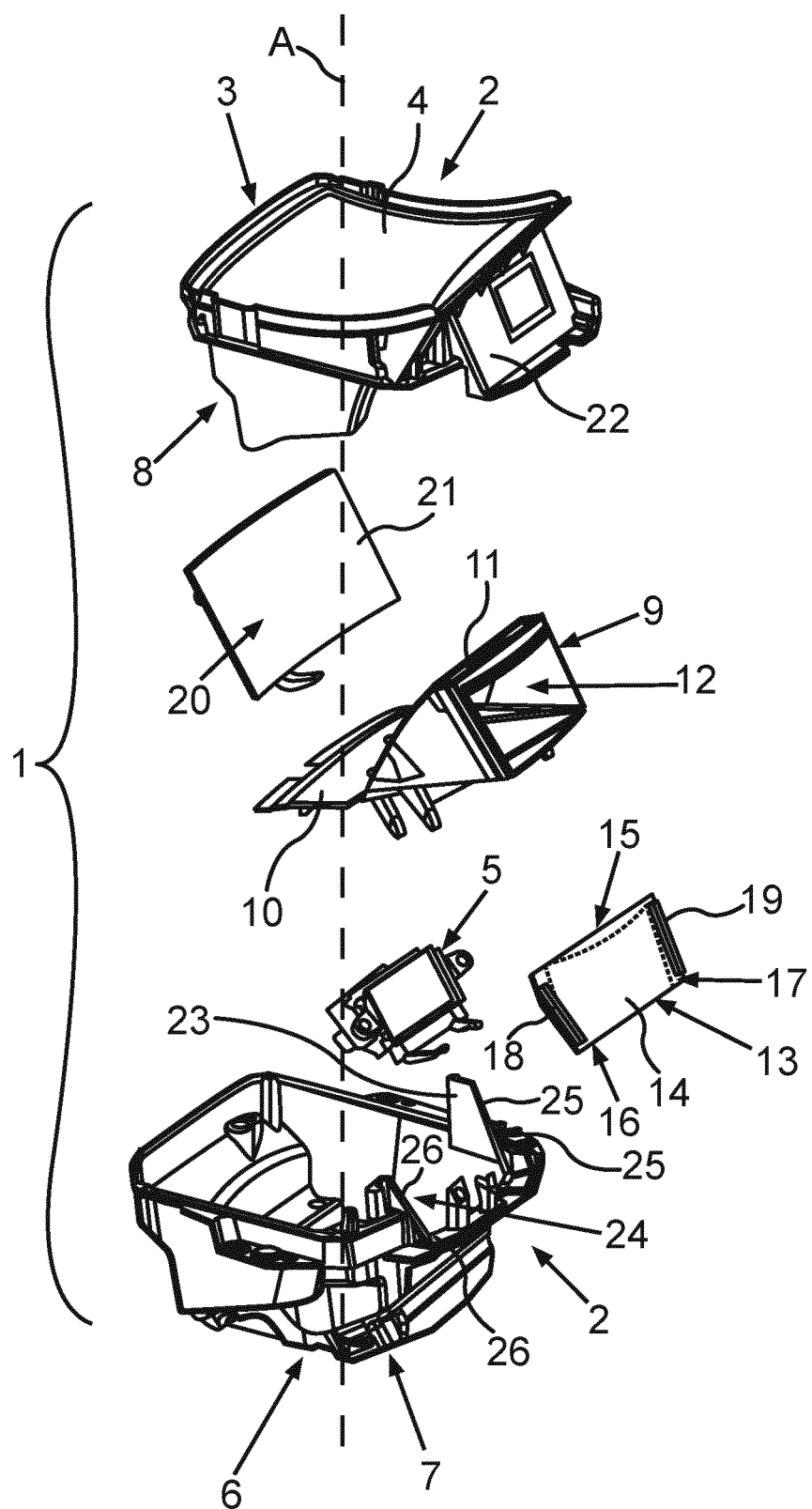
FIG. 1 shows an exploded view of one exemplary embodiment of a head-up display according to the invention.

FIG. 1 shows an exploded view of an exemplary embodiment of a head-up display 1. The head-up display 1 can be installed in a motor vehicle. In this regard, the head-up display 1 can be used to project optical information onto a windshield, for example, thus enabling it to be perceived by a vehicle occupant seated in a driver's seat in the field of view when looking through the windshield. The head-up display 1 has a housing 2. This housing 2 has a cover module 3. The cover module 3 is of trough-like design. It can also be referred to as a shell. In the upper region, it has a viewing window 4. The light beams generated by an image generation unit 5 of the head-up display 1 emerge from the housing 2 to the outside through this viewing window 4. Here, the window 4 is formed by a transparent wall.

The head-up display 1 furthermore has a base module 6. The base module 6 has at least one outer housing 7. This can be connected to an outer housing 8 of the cover module 3 in order to form the housing 2. In this regard, the outer housings 7 and 8 are separate parts. Thus, the outer housing 7 can be formed as a diecast component, for example. The outer housing 8 can be made of plastic, for example. It can be an injection molded component, for example. The outer housings 7 and 8 can also be referred to as shells.

The head-up display 1 furthermore has a component 9. This is a separate component here. In the exemplary embodiment, the component 9 has a base plate 10 and a frame part 11. The component 9 is, in particular, of integral design. It forms a component that provides an optical chamber 12 of the head-up display 1.

Furthermore, in the exemplary embodiment the head-up display 1 has a first mirror 13. The first mirror 13 has a rear side 14 and a front side 15. The front side 15 is provided and arranged for its intended purpose in the housing 2 so that it deflects or reflects light beams that are emitted by the image generation unit 5.

In this case, a respective compression element 18 and 19 is arranged on the rear side 14 at edge regions 16 and 17. In the exemplary embodiment, the compression elements 18 and 19 are foam parts. They are arranged on these edge regions 16 and 17 of the rear side 14. In this regard, adhesive bonding can be provided, for example. Here, the compression elements 18 and 19 are strand-like or rod-shaped components. They can be of correspondingly cuboidal design. Furthermore, in the exemplary embodiment the head-up display 1 has a second mirror 20. In the assembled state of the head-up display 1, this mirror is arranged in such a way that the light beams deflected by the first mirror 13 impinge on a front side 21 of the second mirror 20 and are deflected or reflected from there to the exit window 4.

In the installed state, the first mirror 13 is arranged in a niche 22 of the cover module 3.

As can be seen in FIG. 1, the base module 7 in the exemplary embodiment has two contact elements 23 and 24. These contact elements 24 have strip-shaped contact surfaces and 26. As can be seen in FIG. 1, these contact surfaces 25 and 26 are oriented obliquely. This also applies, in particular, to a longitudinal axis A of the head-up display 1.

Figure 2:
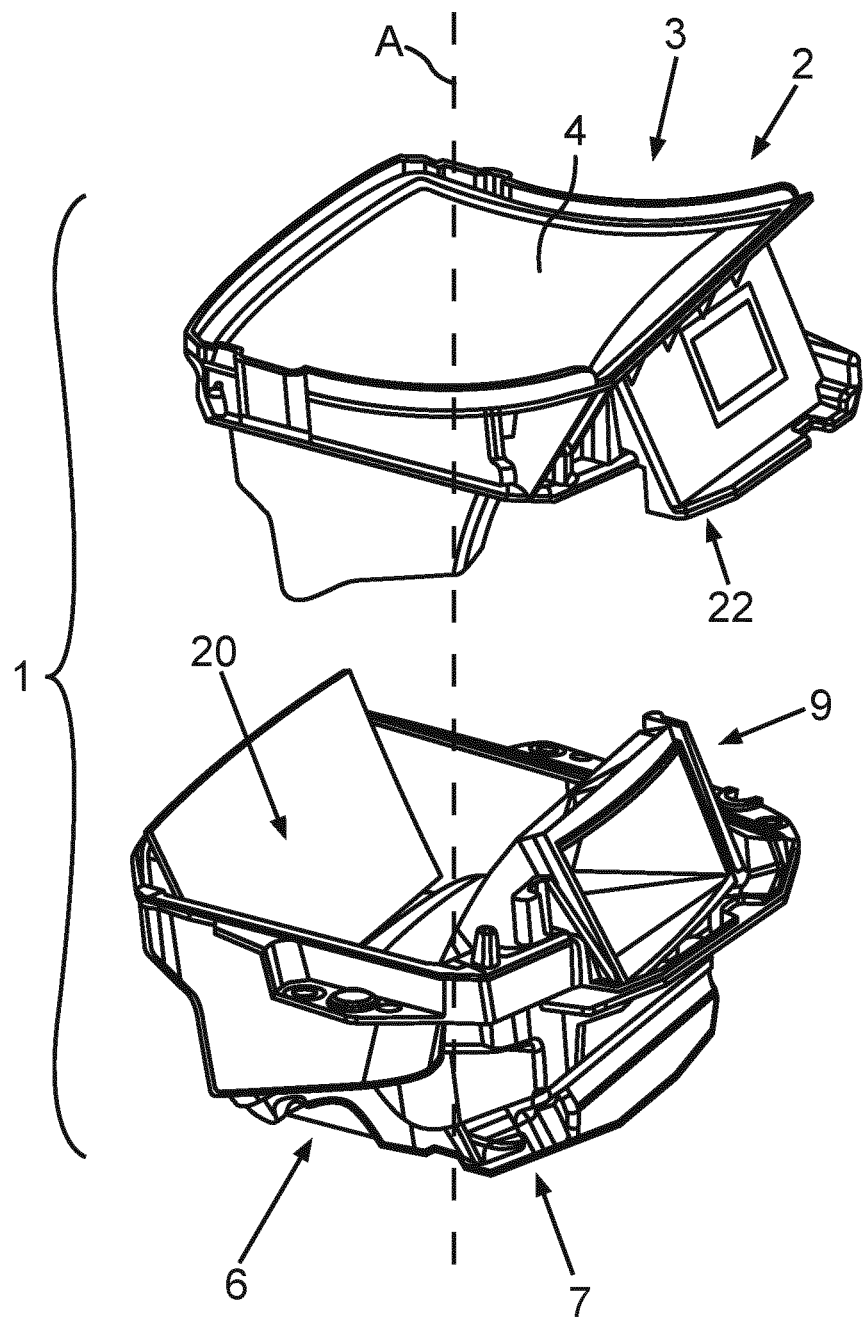
FIG. 2 shows an exploded view of the head-up display according to FIG. 1, wherein some components are already connected to one another as compared with FIG. 1.

FIG. 2 shows an exploded view of the head-up display 1. Here, the base module 6 is shown and both the second mirror 20 and the component 9 are correspondingly installed in the outer housing 7. Also installed is the image generation unit 5, which can no longer be seen in FIG. 2 in this regard. The first mirror 13 is likewise installed in the cover module 3 and, in this regard, is arranged in the niche 22.

Figure 3:
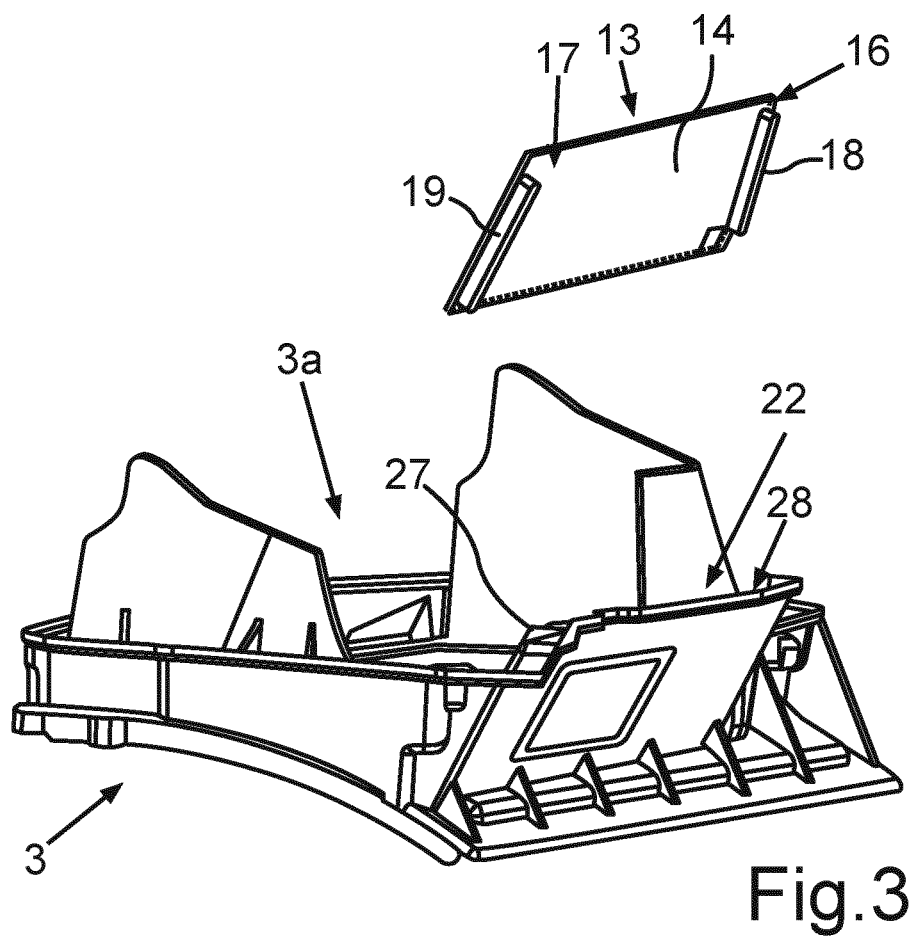
FIG. 3 shows a perspective view of subcomponents of the head-up display according to FIG. 1 in an intermediate assembly state.

With regard to the assembly of the head-up display 1, the cover module 3 is first of all preferably inverted, so that it is upside down (see FIG. 3). This provides access to the interior 3a of the cover module 3, in particular from above. The first mirror 13 is provided. In this regard, it is envisaged here that the compression elements 18 and 19 are already arranged, in particular fastened, on the edge regions 16 and 17. The first mirror 13 provided in this way is then introduced into the cover module 3. For this purpose, the mirror 13 is set in the cover module 3. During this process, the mirror 13 with the compression elements 18 and 19 is arranged in a preassembly position. In this regard, a first supporting surface 27 can be seen in the niche 22 in FIG. 4. This supporting surface 27 can, in particular, be strip-shaped. It is positioned obliquely with respect to the longitudinal axis A. A further supporting surface 28 can be formed on the opposite side. This is intended for direct contact with the further compression element 18.

Figure 4:
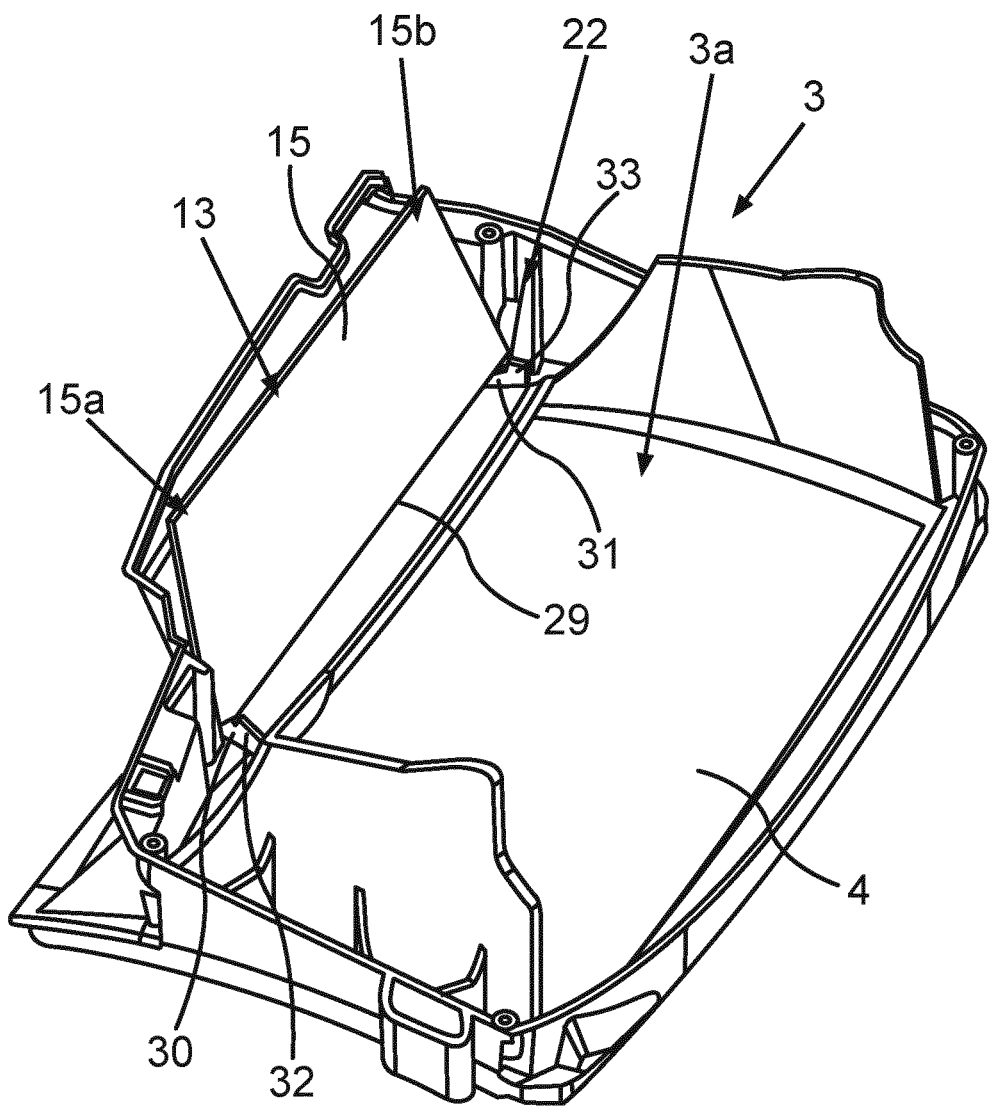
FIG. 4 shows the components according to FIG. 3 in an intermediate assembly state following on from FIG. 3.

FIG. 4 shows the cover module 3 with the first mirror 13 arranged in the preassembly position. In this preassembly position, the mirror 13 rests by an edge 29 on what are here web-like supports 30 and 31 of the cover module 3, in particular the niche 22. In addition, the beam-shaped compression elements 18 and 19 rest against said supporting surfaces 27 and 28. The preassembly position is characterized, in particular, in that the first mirror 13 is only set in this niche 22 and is positioned at an angle by virtue of its oblique setting. As can be seen, the supports 30 and 31 have raised portions 32 and 33. This prevents the first mirror from slipping out of the niche on the supports 30 and 31. The oblique position in this regard is maintained. Furthermore, edge regions 15a and 15b of the front side 15 are also shown in FIG. 4. These lie directly opposite the edge regions 16 and 17 of the rear side 14.

Figure 5:
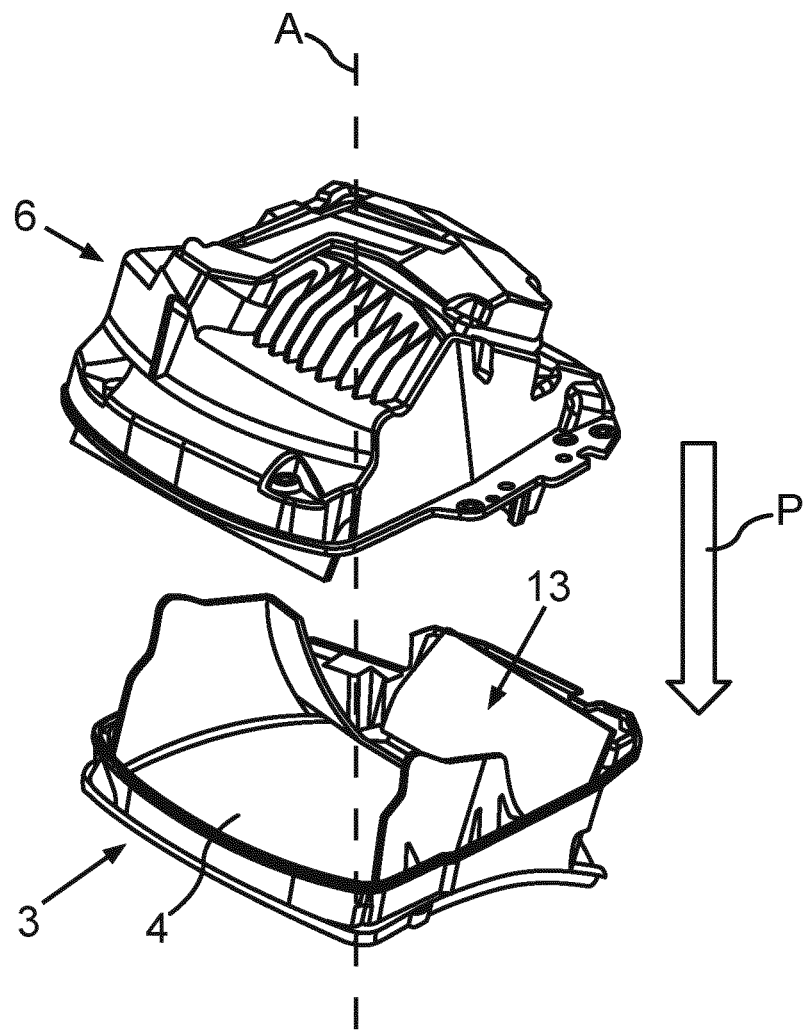
FIG. 5 shows an illustration of components of the head-up display in an intermediate assembly state following on from FIG. 4.

Starting from this intermediate assembly state, in accordance with the illustration in FIG. 5, the base module 6, in particular as already prefabricated in a preassembly module in accordance with the illustration in FIG. 2, is then mounted on the cover module 3. In the exemplary embodiment, the base module 6 is placed on the cover module 3 from above by means of a linear joining direction P.

Figure 6:
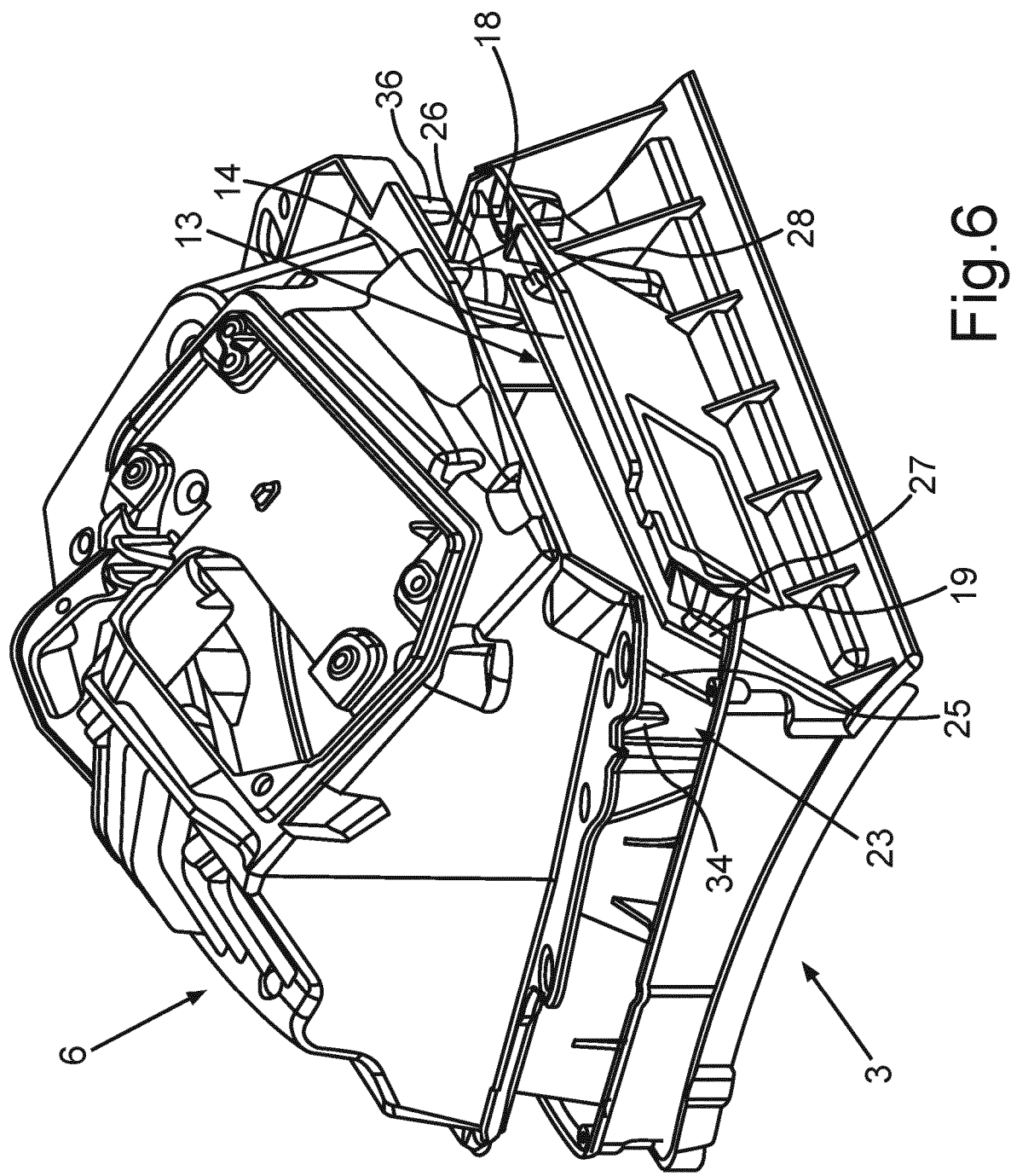
FIG. 6 shows the illustration of the components in FIG. 5 in an intermediate assembly state following on from FIG. 5.
Figure 7:
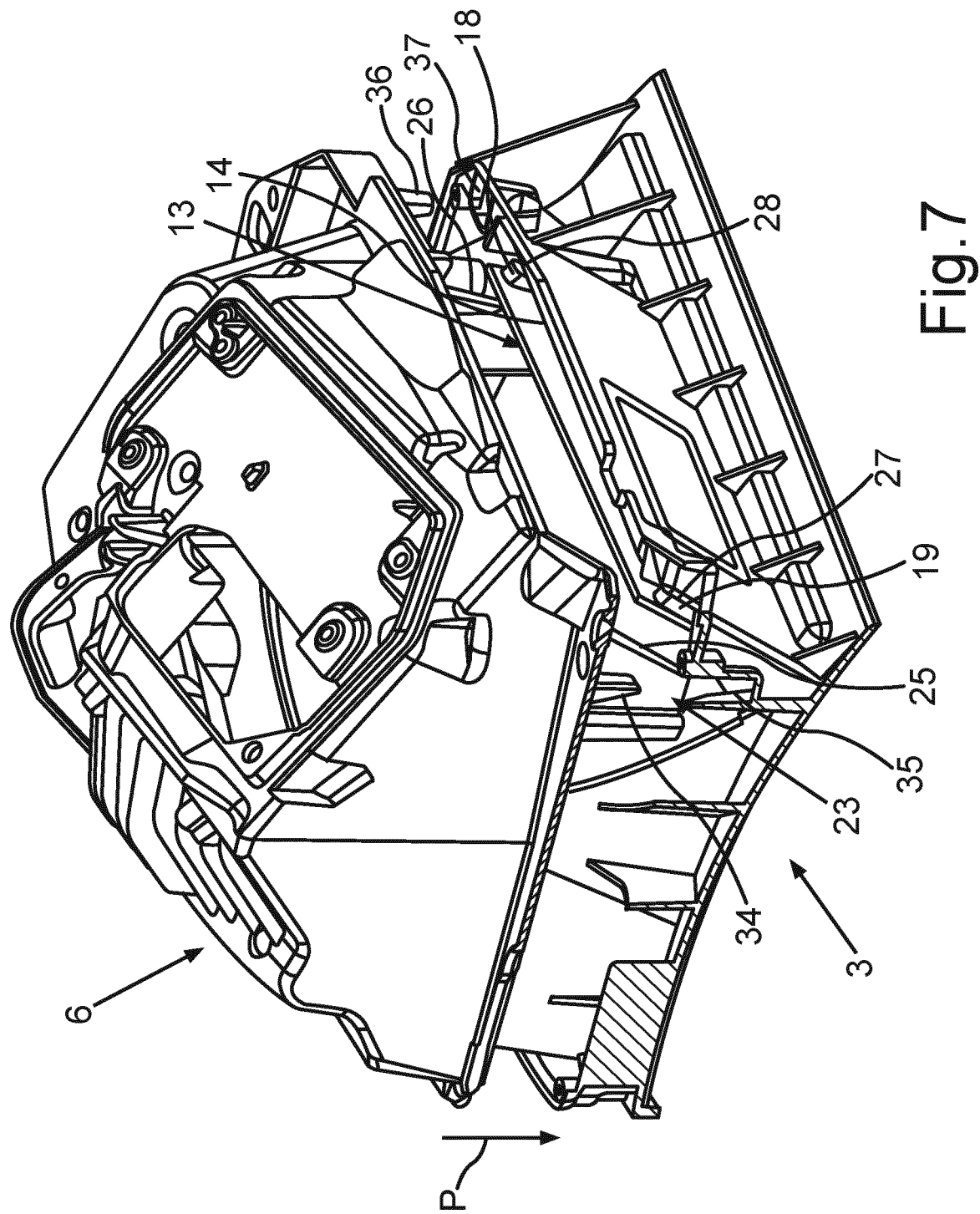
FIG. 7 shows a perspective sectional illustration of the assembly state in FIG. 6.

Based on the illustration in FIG. 5, FIG. 6 shows a state in which joining has already progressed further in this regard. As can also be seen, in particular, in FIG. 6, the base module 6 has an insertion element 34. In the exemplary embodiment, this is here formed directly on the contact element 23. The insertion element 34 is intended for insertion into an insertion receptacle 35 (FIG. 7), which is formed on the cover module 3. A further insertion element 36 (FIG. 6) is formed at the opposite end of the base module 6. Here, in the exemplary embodiment, this is not formed directly on the further contact element 24, but separately and at a distance from it. In addition, a further insertion receptacle 37 is shown, which is formed in the cover module 3. FIG. 7 shows a perspective sectional illustration in this regard, in which the cover module 3 is shown in section in the region of the insertion receptacle 35.

Starting from the intermediate assembly position reached in FIG. 6, the base module 6 is moved linearly toward the cover module 3. The insertion elements 34 and 36 are then subsequently inserted into the insertion receptacles 35 and 37. As the insertion elements 34 and 36 begin to interengage in the insertion receptacles 35 and 37, the contact elements 23 and 24, in particular the strip-shaped contact surfaces 25 and 26, are arranged at a distance from the front side 15 of the first mirror 13. During the further continuation of the insertion process, in which the insertion elements 34 and 36 are inserted into the insertion receptacles 35 and 37, the front side 15 is subsequently contacted directly by the contact elements 23, 24, in particular the strip-shaped contact surfaces 25 and 26. As the insertion process is then again continued further, these contact elements 23 and 24, in particular the contact surfaces 25 and 26 resting directly against the front side 13, move in the state resting thereon relative to this front side 15 and, in particular, then relative to the mirror 13.

Owing to the angled orientation or oblique orientation of the contact surfaces 25 and 26 in relation to the linear joining direction P, as is also shown once again in FIG. 7, a force is exerted by the contact elements 23 and 24, in particular the contact surfaces 25 and 26, on the first mirror 13. This action of force then moves the first mirror 13 toward the supporting surfaces 27 and 28, compressing the compression elements 18 and 19 as it does so. Owing to the oblique orientation of the contact surfaces 25 and 26, the force concerned is generated at an angle not equal to 0° and not equal to 180° to the joining direction P. Owing to this linear or substantially linear joining direction P, the first mirror 13 is, in particular, likewise moved linearly or substantially linearly, more specifically in the direction of these supporting surfaces 27 and 28, by a force oriented at an angle thereto.

Figure 8:
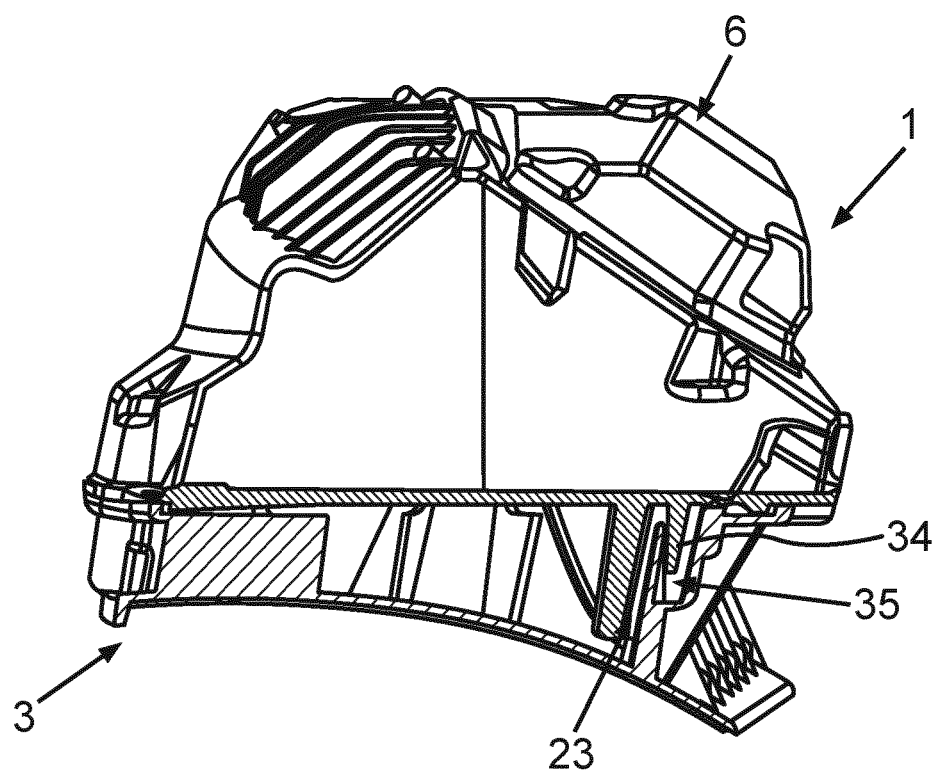
FIG. 8 shows a section through the fully assembled head-up display.

FIG. 8 shows a perspective sectional illustration of the assembled end state between the base module 6 and the cover module 3. The final state fully assembled in this regard is shown. In this context, it can also be seen that an insertion element 34 has been inserted into the insertion receptacle 35. In this regard, FIG. 8 shows a side view of the arrangement according to FIG. 7, and, here too, only the lower region is shown in section and the base module 6 is shown from the side in the upper region. In this assembled final state, the first mirror 13 is then arranged in its final assembly position.

After the final assembly position has been reached, the compression elements 18 and 19 remain compressed. In this regard, the first mirror 13 is mechanically contacted with the strip-shaped supporting surfaces 27 and 28 by means of the compression elements 18 and 19.

The contact surfaces 25, 26 and the beam-shaped compression elements 18, 19 are oriented parallel to one another in pairs on the opposite sides 14, 15 of the first mirror 13. An advantageous force path from the contact elements 23, 24 to the supporting surfaces 27, 28 is thereby formed.

The invention claimed is:

1. A method for assembling a head-up display comprising: providing a first mirror of the head-up display;
    attaching a first, elastic compression element to a first edge region of a rear side of the first mirror and attaching a second, elastic compression element to a second edge region of the rear side of the first mirror;
    introducing the first mirror with the compression elements arranged thereon into a cover module of a housing of the head-up display and setting a preassembly position of the first mirror in the cover module, in which the compression elements rest against supporting surfaces of the cover module;
    attaching a base module of the housing, which is separate from the cover module, to the cover module,
    wherein, as the base module is connected to the cover module, a front side of the first mirror is contacted by contact elements of the base module, and, as the base module continues to be joined to the cover module, the first mirror is pressed into a final assembly position, wherein, for this purpose, the compression elements are compressed and the first mirror is pressed against the supporting surfaces of the cover module.

2. The method as claimed in claim 1, wherein the first mirror is set in the preassembly position in the cover module and is arranged therein in an oblique setting, wherein the first mirror is set up with a peripheral edge on at least one support of the cover module.

3. The method as claimed in claim 1, wherein the compression elements are provided as elongate beams which extend over at least 60%, in particular at least 70%, of the length of the respective edge region of the rear side.

4. The method as claimed in claim 1, wherein the compression elements are provided as foam strips.

5. The method as claimed in claim 1, wherein, as the base module is connected to the cover module, insertion elements of one module are first inserted into insertion receptacles of the other module, wherein, as the insertion elements begin to interengage in the insertion receptacles, the contact elements are still arranged at a distance from the front side of the first mirror.

6. The method as claimed in claim 5, wherein, as the insertion process of the insertion elements into the insertion receptacles continues, the front side is furthermore contacted directly by the contact elements, and, as the insertion process then continues further, the compression elements are compressed and the first mirror is pressed in the direction of the supporting surfaces.

7. The method as claimed in claim 6, wherein, during the further insertion process, the contact elements, which rest against the front side, are moved relative to the front side, and this relative movement generates a force on the first mirror which presses the first mirror in the direction of the supporting surfaces.

8. The method as claimed in claim 7, wherein the oblique orientation of the contact elements results in the direction of the force being generated at an angle not equal to 0° and not equal to 180° to the joining direction in which the base module is joined to the cover module.

9. The method as claimed in claim 1, wherein the base module is connected to the cover module by a linear joining movement in the joining direction.

10. The method as claimed in claim 1, wherein the base module is provided with an integral outer housing, and the contact elements are formed integrally on the outer housing.

11. The method as claimed in claim 1, wherein the base module is provided with an outer housing, and a component separate therefrom for producing an optical chamber in the head-up display is installed in the outer housing, and/or a second mirror of the head-up display is installed in the outer housing, wherein the base module preassembled in this way is connected to the cover module.

12. The method as claimed in claim 11, wherein the component is provided with the contact elements formed integrally thereon.

13. A head-up display for a motor vehicle, comprising: a housing which has a cover module and a base module,
    wherein a first mirror, by which light from an image generation unit of the head-up display is deflected, is arranged in the housing;
    elastic compression elements, which, in an assembled final state, rest against supporting surfaces of the cover module, are arranged on edge regions of a rear side of the first mirror, wherein the base module has contact elements, which rest against a front side, provided for reflection, of the first mirror, such that the first mirror is subjected to a force in the direction of the supporting surfaces, and as a result, the compression elements are compressed in the assembled final state of the first mirror, and the first mirror is pressed against the supporting surfaces.

14. The head-up display as claimed in claim 13, wherein the contact elements have strip-shaped and obliquely oriented contact surfaces which rest directly against edge regions of the front side, which lie opposite the edge regions of the rear side.

15. The head-up display as claimed in claim 14, wherein the contact surfaces and the beam-shaped compression elements are oriented parallel to one another in pairs on the opposite sides of the first mirror.

* * * * *